March 26, 1929. M. CARTER Re. 17,248

FLUID HOLDING TOY

Original Filed June 12, 1926

Inventor
Mitchell Carter

By R. M. Thomas
Attorney

Reissued Mar. 26, 1929. Re. 17,248

UNITED STATES PATENT OFFICE.

MITCHELL CARTER, OF LOS ANGELES, CALIFORNIA.

FLUID-HOLDING TOY.

Original No. 1,603,513, dated October 19, 1926, Serial No. 115,484, filed June 12, 1926. Application for reissue filed March 20, 1928. Serial No. 263,125.

My invention relates to inflatable members of elastic material, examples of which are pneumatic toys which may be given the form of balls, animals, or fish.

An object of this invention is to provide an inflatable elastic member with a valve comprising a collapsible tube and a pocket for pinching the tube to close the latter and to retain the same in pinched condition while the member is in inflated condition.

Another object of this invention is to provide a new and economically constructed ball for children which can be built out of sheet rubber, such as old inner tubes, and which will hold the air as long as is desired or which may be inflated and deflated at will.

A further object of this invention is to provide a toy for indoor play which is not hard and will not be too heavy for any child to play with, and a still further object of this invention is to provide a ball which can easily be repaired when punctured, without much expense, and which will not ruin the ball for future use, as is the case with most soft rubber balls which are filled with air or gas.

These objects I accomplish with the toy illustrated in the accompanying drawings in which similar numerals and letters of reference indicate like parts throughout the several views, in the specification forming a part of this application and pointed out in the appended claims.

Figure 1:
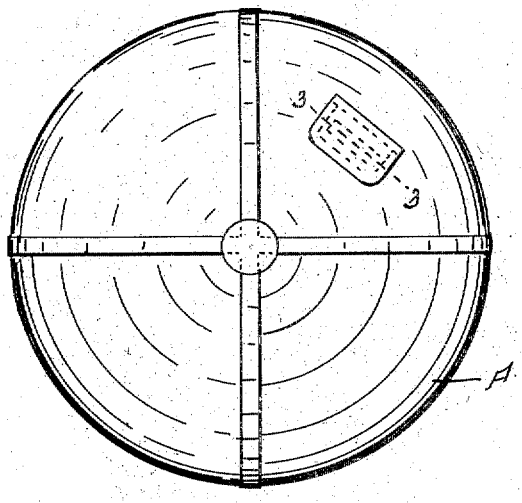
Figure 3:
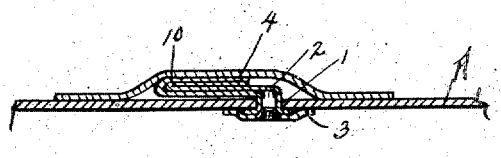
Figure 2:
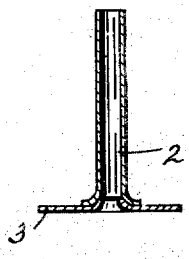
Figure 4:
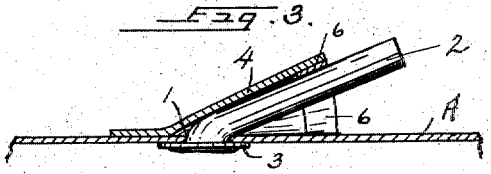
Figure 5:
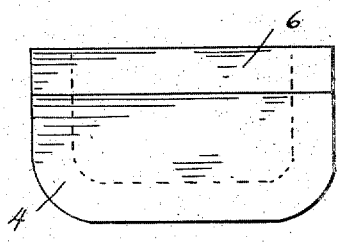

In the drawings of which I have shown the best and most preferred way of making a pneumatic ball, Fig. 1 is a side elevation of the ball; Fig. 2 is a section of the tube used to inflate the ball; Fig. 3 is a section on line 3—3 of the tube and closure portion of Fig. 1; Fig. 4 is a section of the rubber tube for the ball, showing the tube in place therein and ready for inflation of the ball; and Fig. 5 is a plan view of the cover portion of the ingress and egress opening.

In the drawings, I have shown a rubber ball marked A, in which I cut a small hole 1, through which a collapsible tube 2 preferably of similar rubber is passed. A small circular portion 3 of rubber is then attached to the inner end of the tube 2 by any desirable means such as cement, and the inner face of the said portion 3 may be to the inner side of the ball, as shown in Fig. 4. A cover or flap 4 of elastic material is then attached to the outside of the ball, as shown in Figs. 3, 4 and 5, preferably on three of its edges to form a pocket. Said cover 4 may have a reinforcement of elastic material 6 secured along its free edge to make it conform tightly with the adjacent perimeter of the ball when it has been inflated. The ball A, as shown and when it is made of elastic material such as old inner tire tubes, is made of four gores cut so that when pieced together they will form a sphere, and the portions may be then secured together by strips of rubber and cement to form an air-tight ball. The ball can be constructed of old inner tubes and is very lasting when used indoors or out. When punctured, the ball can be repaired by fitting a small patch over the hole and cementing it in place.

To inflate the ball, the tube 2 is drawn out from under the cover 4 and air introduced into the interior of the ball. When sufficient air has been blown into the ball the tube 2 is then bent back upon itself, as at 10 in Fig. 3, and in such collapsed condition is pushed under the flap 4. The stretching of the rubber, both of the ball and the cover, will draw the flap down closely to the face of the ball, and, when the tube is pushed under the flap with a fold still in the tube, the flap will press tightly against it and, with the pressure of the air on the inside of the ball, the tube will be pinched so tightly that air will not escape therefrom. When the ball is desired deflated, the tube is drawn from under the cover 4 and the air is allowed to escape.

Having thus described my invention, I desire to secure by Letters Patent and claim:—

1. In combination with an inflatable member having an elastic wall, a collapsible tube adapted to be folded upon itself so as to close its bore, said tube being connected to said wall and communicating with the chamber of said member, said wall having a flap of elastic material secured to said wall and overlapping said tube at its juncture to said wall whereby to be placed under tension and pulled tight against said wall upon expansion of the latter to pinch said tube.

2. In combination with an inflatable member having an elastic wall, a collapsible tube adapted to be folded upon itself so as to be collapsed against said wall, a flap of elastic material on said wall disposed over said tube at its juncture with said wall whereby to be placed under tension and pulled tight against said wall upon expansion of the latter.

3. In combination with an inflatable member having an elastic wall, a collapsible tube adapted to be folded upon itself so as to close the bore thereof, a flap of elastic material disposed over said tube and joined to said wall to form a pouch for said tube covering the base portion thereof whereby upon said wall being expanded said tube will be collapsed by said pouch.

4. In a toy of the class described the combination of a plurality of pieces of rubber cut and secured together to form a sphere having an opening through its wall; a tube in said opening; a holding portion secured to said tube and then to said sphere; a cover over said tube secured to said sphere on three of its edges; and a reinforced strip along the free edge of said cover.

5. An inflatable and deflatable toy made of soft rubber and having a hole in its wall; a soft rubber tube passed through said hole with its end portion secured to the inner face of said toy; a soft rubber cover for said hole and tube with its edges secured to the body of said toy except for a portion of one edge to hold the tube when folded upon itself against the body of the inflated toy.

6. An article made of soft rubber and having a hole through its wall; a soft rubber tube having one end outwardly flanged; a reinforcing member secured to the flange of said tube and to the wall of said article and having a hole therein in alinement with the hole in the wall and with the interior of the tube, with the free end portion of said tube extended through the hole in the wall of said article; a cover member made of soft rubber secured to the exterior of said article and covering said hole and said tube when the tube is bent upon itself and inserted between said cover member and the exterior of said article; and a reinforcement member for a portion of the edge of said cover member secured to the inner face of said cover member and with its end portions secured to the exterior wall of said article.

In witness whereof I have signed this specification.

MITCHELL CARTER.